United States Patent
Sim et al.

(10) Patent No.: US 12,429,915 B2
(45) Date of Patent: Sep. 30, 2025

(54) DISPLAY DEVICE

(71) Applicant: Samsung Display Co., LTD., Yongin-si (KR)

(72) Inventors: Jin Gyu Sim, Suwon-si (KR); Byoung Jin Jin, Yongin-si (KR); Jae Ill Kim, Hwaseong-si (KR); Byoung Haw Park, Osan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 322 days.

(21) Appl. No.: 17/988,139

(22) Filed: Nov. 16, 2022

(65) Prior Publication Data
US 2023/0297139 A1    Sep. 21, 2023

(30) Foreign Application Priority Data
Mar. 16, 2022    (KR) .................. 10-2022-0032760

(51) Int. Cl.
*G06F 1/16*    (2006.01)
(52) U.S. Cl.
CPC .......... *G06F 1/1652* (2013.01); *G06F 1/1656* (2013.01)
(58) Field of Classification Search
CPC .... G06F 1/1652; G06F 1/1656; G06F 1/1601; H10K 77/111; H10K 50/84; H10K 2102/311; G09F 9/301
See application file for complete search history.

(56) References Cited

U.S. PATENT DOCUMENTS 9,823,697 B2    11/2017  Hsu et al.
10,530,081 B1*   1/2020  Costello ............... H01R 12/724
2021/0014982 A1*  1/2021  Bok .................... H10K 50/8426
2021/0183275 A1*  6/2021  Han ....................... G09F 9/301
2021/0204427 A1   7/2021  Pyo
2021/0343194 A1* 11/2021  Suga ..................... G09F 9/301
2021/0392751 A1* 12/2021  Kim .................... H01L 23/5385

FOREIGN PATENT DOCUMENTS

| KR | 1020160097033   | 8/2016  |
| KR | 20170062343 A   | 6/2017  |
| KR | 20170124159 A   | 11/2017 |
| KR | 20180027318 A   | 3/2018  |
| KR | 1020200004003   | 1/2020  |
| KR | 1020200063774   | 6/2020  |
| KR | 20210158142 A   | 12/2021 |

* cited by examiner

*Primary Examiner* — Allen L Parker
*Assistant Examiner* — Keon Kim
(74) *Attorney, Agent, or Firm* — CANTOR COLBURN LLP

(57) ABSTRACT

A display device includes a display panel including first edges extending in a first direction and facing each other and second edges extending in a second direction and facing each other, the second direction intersecting the first direction, a printed circuit board connected to the display panel and including a connector, a rotating shaft which extends in the first direction and in which the printed circuit board is disposed and a hollow is defined, and a flexible cable including an end connected to the connector of the printed circuit board. The rotating shaft includes an overlapping portion which overlaps the display panel and a first protruding portion which protrudes further than one of the second edges of the display panel in the first direction. The display panel and the flexible cable are rolled or unrolled by being wound or unwound around an outer circumferential surface of the rotating shaft.

21 Claims, 17 Drawing Sheets

DISPLAY DEVICE

This application claims priority to Korean Patent Application No. 10-2022-0032760, filed on Mar. 16, 2022, and all the benefits accruing therefrom under 35 U.S.C. § 119, the content of which in its entirety is herein incorporated by reference.

BACKGROUND

1. Field

The disclosure relates to a display device.

2. Description of the Related Art

As information technologies are advancing, a market for display devices used as a connection medium between users and information is growing. Accordingly, a use of display devices such as organic light-emitting display ("OLED") devices, liquid crystal displays ("LCDs"), or the like is increasing.

Among such display devices, an organic light-emitting display device is a self-luminous device, and thus, may be manufactured to have lower power consumption and thinner profile than an LCD requiring a backlight unit. Further, the organic light-emitting display device has advantages of a wide viewing angle and a fast response speed. A process technology of organic light-emitting display devices advances to a mass-production technology level, so the market thereof expands in competition with LCDs.

Pixels in an organic light-emitting display device include organic light-emitting diodes ("OLED"), which are self-luminous. Organic light-emitting display devices may be classified into a variety of displays, depending on the type of emissive material, the emission type, the emission structure, and the driving method. Organic light-emitting display devices may be classified into fluorescent emission devices and phosphorescent emission devices depending on the emission method, or classified into top emission devices and bottom emission devices depending on the emission structure. In addition, organic light-emitting display devices may be classified into passive matrix OLEDs ("PMOLEDs") and an active-matrix OLEDs ("AMOLEDs") depending on the driving method.

Flexible displays are becoming commercially available. A flexible display devices may reproduce an input image on a screen of a display panel in which a plastic OLED is formed. The plastic OLED is formed on a bendable plastic substrate. The flexible display devices may be implemented to have various designs and are advantageous in terms of portability and durability. Flexible display devices may be implemented in various forms such as bendable display devices, foldable display devices, rollable display devices, or the like. Such flexible display devices may be used in televisions ("TVs"), car displays, and wearable devices, as well as mobile devices such as smartphones and tablet personal computers ("PCs"), and are broadening their range of applications.

SUMMARY

Features of the disclosure provide a display device which has a reduced overall set size including a rotating shaft.

However, features of the disclosure are not restricted to those set forth herein. The above and other features of the disclosure will become more apparent to one of ordinary skill in the art to which the disclosure pertains by referencing the detailed description of the disclosure given below.

An embodiment of a display device includes a display panel including first edges extending in a first direction and facing each other and second edges extending in a second direction and facing each other, the second direction intersecting the first direction, a printed circuit board connected to the display panel and including a connector, a rotating shaft which extends in the first direction, and in which the printed circuit board is disposed and a hollow is defined, and a flexible cable including a first end connected to the connector of the printed circuit board. The rotating shaft includes an overlapping portion which overlaps the display panel and a first protruding portion which protrudes further than one of the second edges of the display panel in the first direction, and the display panel and the flexible cable are rolled or unrolled by being wound or unwound around an outer circumferential surface of the rotating shaft.

An embodiment of a display device includes a display panel including first edges extending in a first direction and facing each other and second edges extending in a second direction and facing each other, the second direction intersecting the first direction, a printed circuit board connected to the display panel and including a connector, a rotating shaft which extends in the first direction, and in which the printed circuit board is disposed and a hollow is defined, and a flexible cable including an end connected to the connector of the printed circuit board. The rotating shaft includes an overlapping portion which overlaps the display panel and a first protruding portion which protrudes further than one of the second edges of the display panel in the first direction, the display panel is rolled or unrolled by being wound or unwound around an outer circumferential surface of the overlapping portion of the rotating shaft, and the flexible cable does not overlap the display panel.

An embodiment of a display device includes a display panel including first edges extending in a first direction and facing each other and second edges extending in a second direction and facing each other, the second direction intersecting the first direction, a printed circuit board connected to the display panel and including a first connector and a second connector spaced apart from the first connector, a rotating shaft having the printed circuit board embedded therein, extending in the first direction, and having a hollow therein, and a first flexible cable including an end connected to the first connector of the printed circuit board and a second flexible cable including an end connected to the second connector of the printed circuit board. The rotating shaft includes an overlapping portion which overlaps the display panel and a first protruding portion which protrudes further than one of the second edges of the display panel in the first direction, and the display panel, the first flexible cable, and the second flexible cable are rolled or unrolled by being wound or unwound around an outer circumferential surface of the rotating shaft.

It should be noted that the effects of the disclosure are not limited to those described above, and other effects of the disclosure will be apparent from the following description.

BRIEF DESCRIPTION OF THE DRAWINGS

The above and other embodiments and features of the disclosure will become more apparent by describing embodiments thereof with reference to the attached drawings, in which.

DETAILED DESCRIPTION

Embodiments of the disclosure will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will filly convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification. In the attached drawing figures, the thickness of layers and regions is exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the disclosure will be described with reference to the attached drawings.

Figure 1:
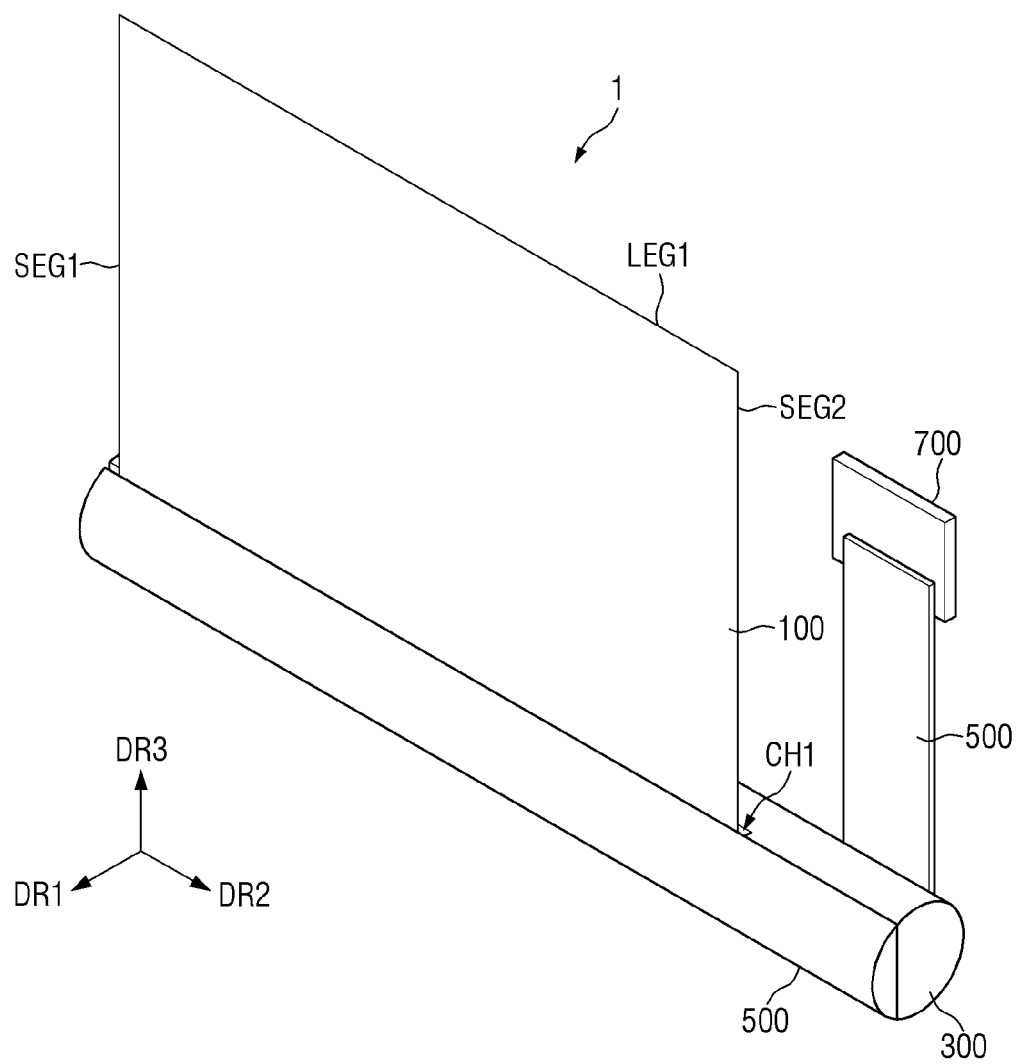
FIG. 1 is a perspective view of an embodiment of a display device.
Figure 2:
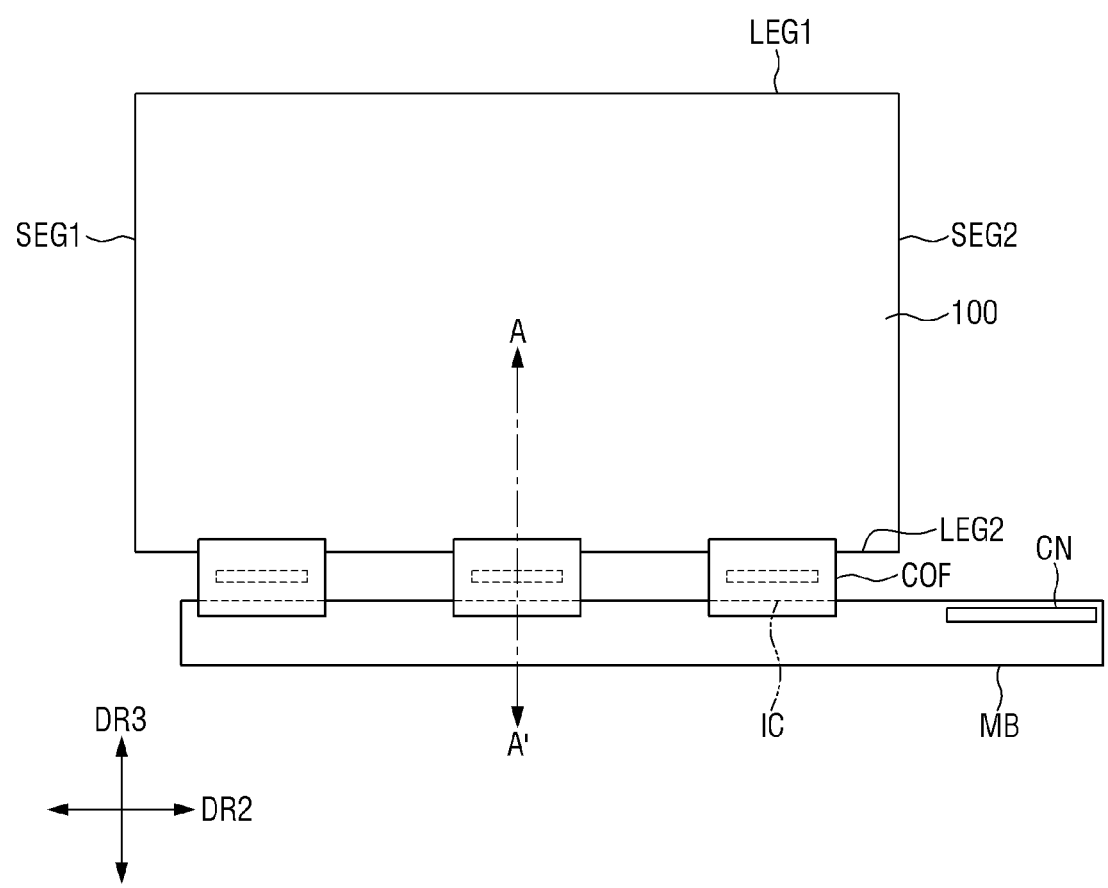
FIG. 2 is a plan view showing a display panel, a chip-on film, and a printed circuit board of the display device of FIG. 1.
Figure 3:
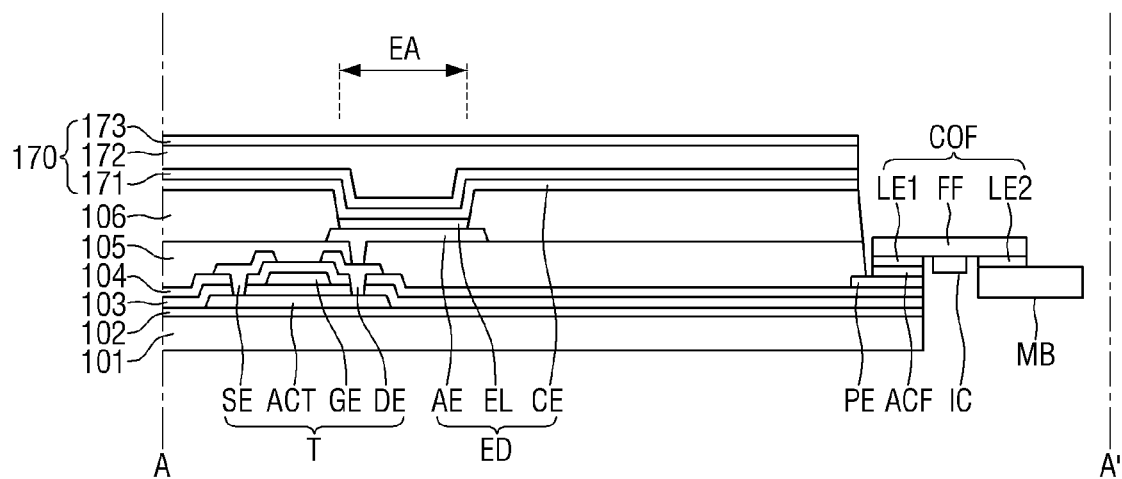
FIG. 3 is a cross-sectional view taken along line A-A' of FIG. 2.

FIG. 1 is a perspective view of an embodiment of a display device. FIG. 2 is a plan view showing a display panel, a chip-on film, and a printed circuit board of the display device of FIG. 1. FIG. 3 is a cross-sectional view taken along line A-A' of FIG .2.

Referring to FIGS. 1 to 3, a display device 1 in an embodiment may include a display panel 100, a rotating shaft 300, a flexible cable 500, and a main board 700.

The display panel 100 may include first edges LEG1 and LEG2 extending along a second direction DR2 and second edges SEG1 and SEG2 extending along a third direction DR3. The second direction DR2 and the third direction DR3 may intersect each other.

The display panel 100 may include a liquid crystal display panel, an organic light-emitting diode display panel, an inorganic light-emitting diode display panel, or a quantum dot display panel. In the following description, the display panel 100 will be mainly described as an organic light-emitting diode display panel for convenience of description.

The display panel 100 may be easily, repeatedly rolled (or wound) or unrolled (or unwound) around an outer circumferential surface of the rotating shaft 300 since the display panel 100 has flexibility.

The display panel 100 may include a first surface and a second surface opposite to the first surface. The first surface of the display panel 100 may be a display surface. A predetermined stacked structure of the display panel 100 is shown in FIG. 3.

As shown in FIG. 3, the display panel 100 may include display pixels that display an image. Each of the display pixels may include a light-emitting element ED and a thin film transistor T.

A display substrate 101 may include an insulating material, such as glass or polymer resin. In an embodiment, the display substrate 101 may include polyimide. The display substrate 101 may be a flexible substrate that is bendable, foldable, or rollable, for example.

A buffer layer 102 may be disposed on the display substrate 101. The buffer layer 102 is a layer for protecting the thin film transistor T and the light-emitting element ED from moisture permeating through the display substrate 101 that is vulnerable to moisture infiltration. Although not shown, the buffer layer 102 may include a plurality of inorganic layers alternately stacked. In an embodiment, the buffer layer 102 may be formed or provided as a multi-layer in which one or more inorganic layers of a silicon nitride layer, a silicon oxynitride layer, a silicon oxide layer, a titanium oxide layer, and an aluminum oxide layer are alternately stacked, for example.

An active layer ACT of the thin film transistor T may be disposed on the buffer layer 102. The active layer ACT of the thin film transistor T may include polycrystalline silicon, single crystalline silicon, low-temperature polycrystalline silicon, amorphous silicon, or an oxide semiconductor. The active layer ACT may include a source region and a drain region. The source region and the drain region are formed by doping a silicon semiconductor or oxide semiconductor with ions or impurities and thus have conductivity. The active layer ACT may overlap a gate electrode GE in a thickness direction of the display substrate 101, and the source region and drain region may not overlap the gate electrode GE in the thickness direction.

A gate insulating layer 103 may be disposed on the active layer ACT of the thin film transistor T. The gate insulating layer 103 may be a silicon nitride layer, a silicon oxynitride layer, a silicon oxide layer, a titanium oxide layer, or an aluminum oxide layer, for example.

A gate electrode GE of the thin film transistor T may be disposed on the gate insulating layer 103. The gate electrode GE may overlap the active layer ACT in the thickness direction. The gate electrode GE may be a single layer or a multilayer including any one or more of molybdenum (Mo), aluminum (Al), chromium (Cr), gold (Au), titanium (Ti), nickel (Ni), neodymium (Nd), copper (Cu), and any alloys of these materials.

An inter-insulating layer 104 may be disposed on the gate electrode GE. The inter-insulating layer 104 may be an inorganic layer, e.g., a silicon nitride layer, a silicon oxynitride layer, a silicon oxide layer, a titanium oxide layer, or an aluminum oxide layer.

A source electrode SE and a drain electrode DE may be disposed on the inter-insulating layer 104. The source electrode SE and the drain electrode DE may be respectively connected to the source region and the drain region of the active layer ACT through contact holes penetrating the inter-insulating layer 104 and the gate insulating layer 103.

The source electrode SE and the drain electrode DE may each be a single layer or a multilayer including any one or more of molybdenum (Mo), aluminum (Al), chromium (Cr), gold (Au), titanium (Ti), nickel (Ni), neodymium (Nd), copper (Cu), and any alloys of these materials.

A via layer 105 may be disposed on the source electrode SE and the drain electrode DE. The via layer 105 may be formed or provided as an organic layer such as an acrylic resin layer, an epoxy resin layer, a phenolic resin layer, a polyamide resin layer, or a polyimide resin layer.

The light-emitting elements ED and banks 106 may be disposed on the via layer 105. Each of the light-emitting elements ED includes a light-emitting pixel electrode AE, an emissive layer EL, and a light-emitting common electrode CE.

The light-emitting pixel electrode AE may be disposed on the via layer 105. The light-emitting pixel electrode AE may penetrate the via layer 105 and be connected to the drain electrode DE.

In the top-emission structure in which light is emitted from the emissive layer toward the light-emitting common electrode CE, the light-emitting pixel electrode AE may have a stacked structure of indium tin oxide/silver/indium tin oxide (ITO/Ag/ITO), for example. However, the disclosure is not limited thereto.

The bank 106 may partition the light-emitting pixel electrode AD on the via layer 105 in order to define an emission area EA. The bank 106 may cover an edge of the light-emitting pixel electrode AE. The bank 106 may be formed or provided as an organic layer such as an acrylic resin layer, an epoxy resin layer, a phenolic resin layer, a polyamide resin layer and a polyimide resin layer.

In the emission area EA, the light-emitting pixel electrode AE, the emissive layer EL, and the light-emitting common electrode CE may be sequentially stacked one on another, so that holes from the light-emitting pixel electrode AE and electrons from the light-emitting common electrode CE may be combined with each other in the emissive layer EL to emit light.

The emissive layer EL is formed or disposed on the light-emitting pixel electrode AE. The emissive layer EL may include an organic material and emit light of a predetermined color. In an embodiment, the emissive layer EL may include a hole transporting layer, an organic material layer, and an electron transporting layer, for example. The emissive layer EL may emit light of at least one color.

The light-emitting common electrode CE is formed or disposed on the emissive layer EL. The light-emitting common electrode CE may cover the emissive layer EL. The light-emitting common electrode CE may be a common layer formed or disposed across the emission area EA. A capping layer may be formed or disposed on the light-emitting common electrode CE.

In the top-emission structure, the light-emitting common electrode CE may include a transparent conductive oxide ("TCO") such as ITO and indium zinc oxide ("IZO") that may transmit light, or a semi-transmissive conductive material such as magnesium (Mg), silver (Ag) and an alloy of magnesium (Mg) and silver (Ag).

An encapsulation layer 170 may be disposed on the light-emitting common electrode CE. The encapsulation layer 170 may include at least one inorganic layer to prevent permeation of oxygen or moisture into a light-emitting element layer EML. The encapsulation layer 170 may include at least one organic layer to protect the light-emitting elements ED from foreign substances such as dust. In an embodiment, the encapsulation layer 170 may include a first encapsulation inorganic layer 171, an encapsulation organic layer 172, and a second encapsulation inorganic layer 173, for example.

A pad electrode PE may be disposed in the same layer as the source electrode SE and the drain electrode DE. The pad electrode PE may include at least one of the materials listed above as example materials of the source electrode SE and the drain electrode DE.

The display device 1 may further include a chip-on film COF attached to an end (first edge LEG2) of the display panel 100 in a direction opposite to a third direction DR3 and a printed circuit board MB attached to an end of the chip-on film COF. The chip-on film COF may be electrically connected to the pad electrode PE of the display panel 100. The chip-on film COF may include a base film FF and first and second lead electrodes LE1 and LE2. The base film FF may include a flexible material. A driving chip IC may be disposed (e.g., mounted) on a rear surface of the base film FF. The first lead electrode LE1 may be electrically connected to the pad electrode PE through an anisotropic conductive film ACF, and the second lead electrode LE2 may be electrically connected to the printed circuit board MB.

As shown in FIG. 2, the printed circuit board MB may further protrude from the second edge SEG2 of the display panel 100 in one direction (a second direction DR2 in FIG. 1). A connector CN may be disposed in an area of the printed circuit board MB further protruding from the second edge SEG2 of the display panel 100 in one direction (the second direction DR2 in FIG. 1). The connector CN may be connected to the flexible cable 500 of FIG. 1. An end of the flexible cable 500 may be connected to the main board 700.

The rotating shaft 300 may have the above-described printed circuit board MB embedded therein, extend along the second direction DR2, and a hollow may be defined in the rotating shaft 300.

A first cut-out groove CH1 extending along the second direction DR2 may be defined in the rotating shaft 300. The first cut-out groove CH1 may penetrate the outer circumferential surface of the rotating shaft 300 and may connect the exterior of the rotating shaft 300 to the hollow of the rotating shaft 300. The display panel 100 may penetrate the first cut-out groove CH1 along the third direction DR3.

The rotating shaft 300 may allow the display panel 100 to be rolled or unrolled while rotating in a clockwise and/or counterclockwise direction, as will be described with reference to FIGS. 4 and 5.

Figure 4:
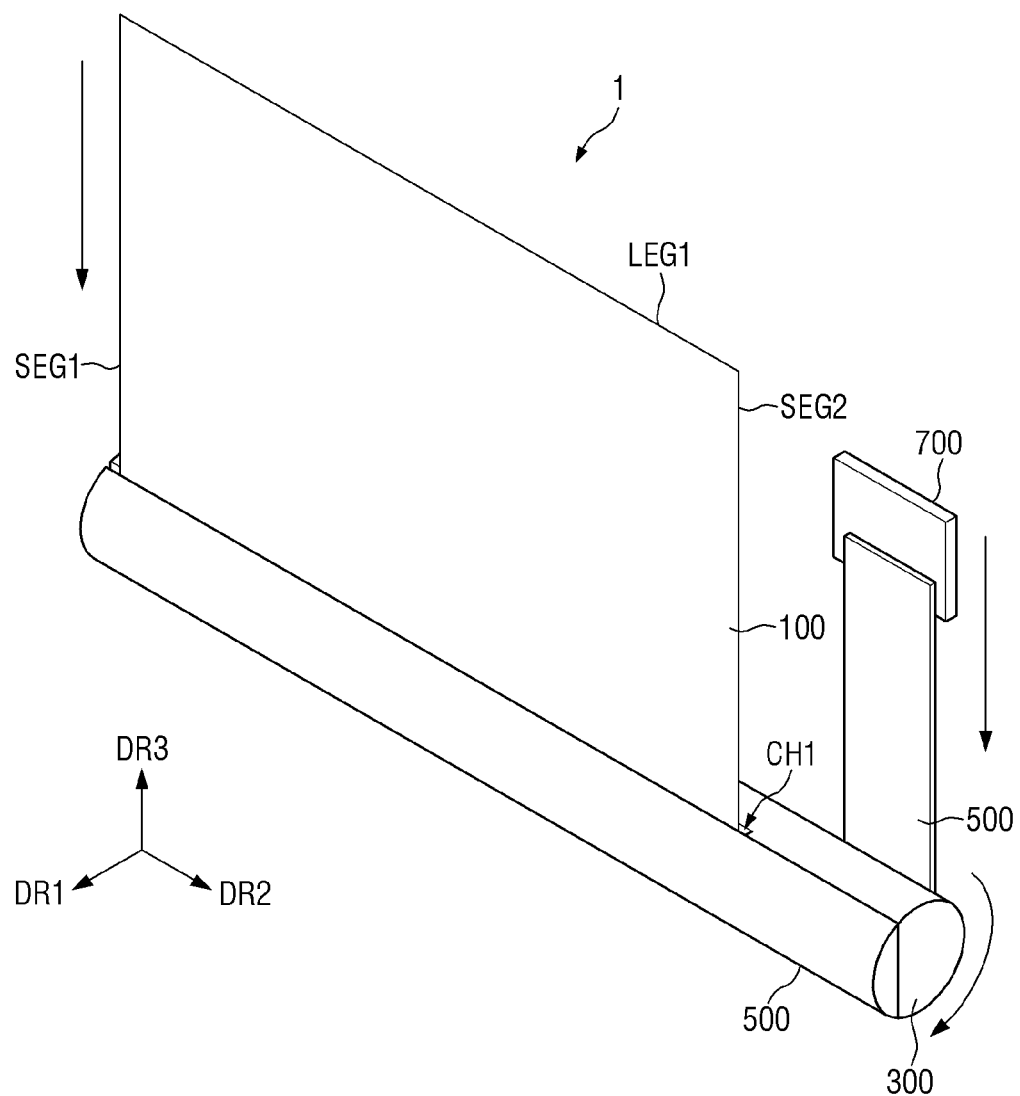
FIGS. 4 and 5 are schematic diagrams showing rolling and unrolling of a display panel of the display device of FIG. 1.
Figure 5:
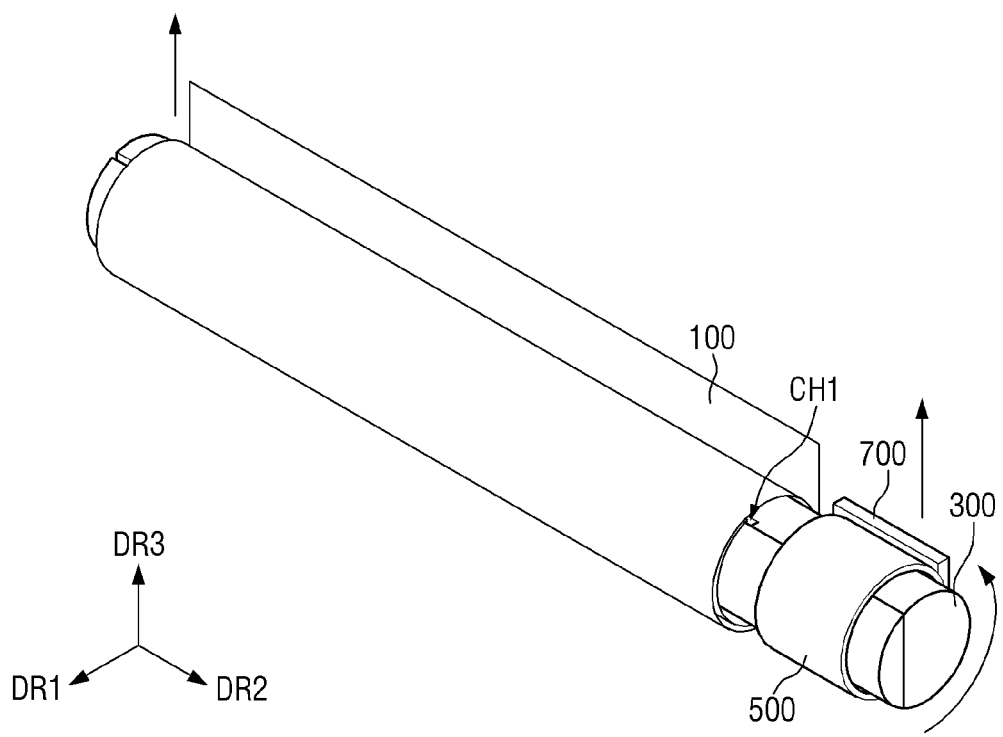

FIGS. 4 and 5 are schematic diagrams showing rolling and unrolling of a display panel of the display device of FIG. 1.

Referring to FIGS. 4 and 5, as described above, the display panel 100 and the flexible cable 500 may be rolled and/or unrolled by being wound and/or unwound around the outer circumferential surface of the rotating shaft 300. In the same way as the display panel 100, the flexible cable 500 may be rolled and/or unrolled by being wound and/or unwound around the outer circumferential surface of the rotating shaft 300.

In FIG. 4, the display panel 100 and the flexible cable 500 are wound onto the rotating shaft 300 while the rotating shaft 300 rotates in the clockwise direction, but the discloser is not limited thereto. In an embodiment, the display panel 100 and the flexible cable 500 may be wound onto the rotating shaft 300 while the rotating shaft 300 rotates in the counterclockwise direction, for example. Hereinafter, a description will be given, focusing on an embodiment in which the display panel 100 and the flexible cable 500 are wound onto the rotating shaft 300 while the rotating shaft 300 rotates in the clockwise direction.

As shown in FIG. 5, the display panel 100 and the flexible cable 500 may be unwound from the rotating shaft 300 while the rotating shaft 300 rotates in the counterclockwise direction.

Figure 7:
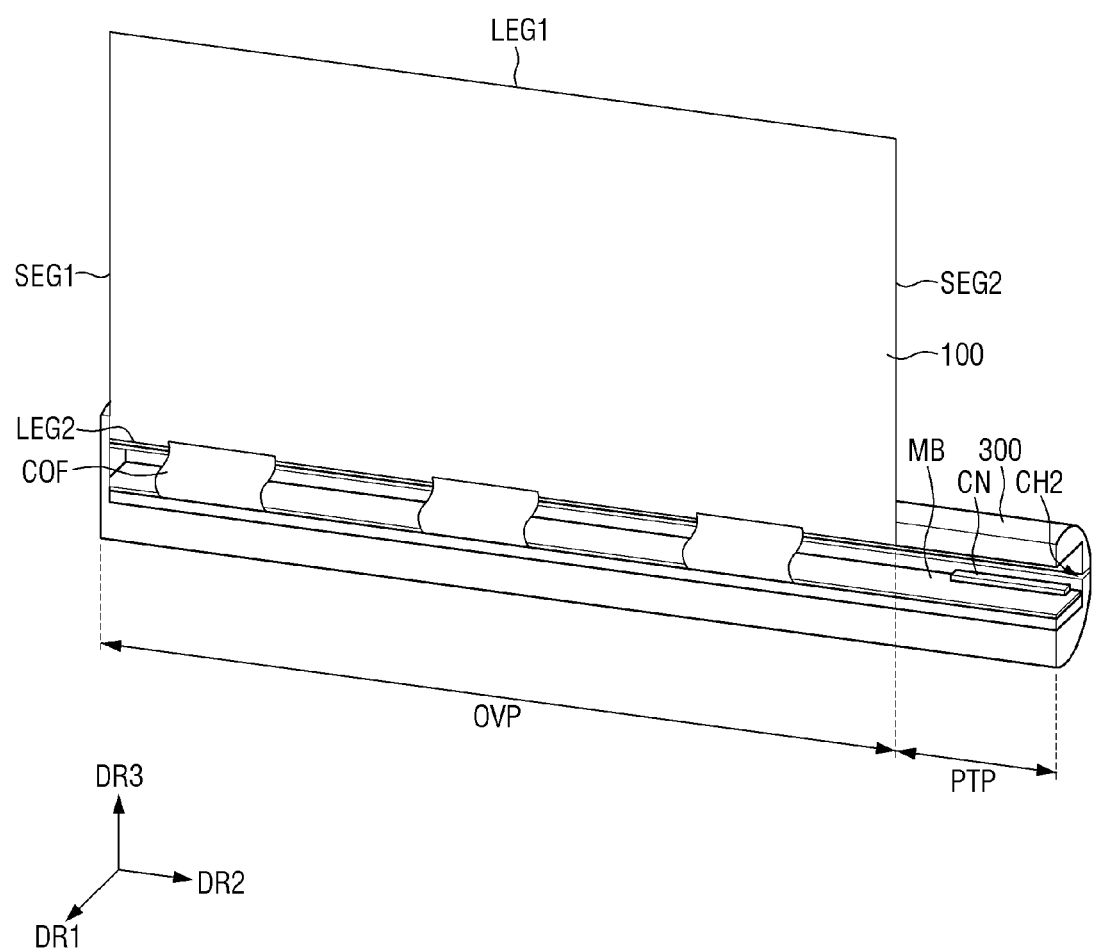
FIG. 7 is a perspective view showing an embodiment of a display panel, a rotating shaft, and the interior of the rotating shaft of the display device of FIG. 1.

The winding and unwinding of the display panel 100 and the flexible cable 500 according to the clockwise/counterclockwise rotation of the rotating shaft 300 is possible because the printed circuit board MB connected to the display panel 100 through the chip-on film COF is fixedly embedded inside (or in the hollow) of the rotating shaft 300 and the flexible cable 500 is connected to the printed circuit board MB (refer to FIG. 7). More specifically, although not shown, a separate first housing in which the rotating shaft 300 is disposed (e.g., mounted) and a second housing in which the main board 700 is disposed (e.g., mounted) may be disposed. The first housing and the second housing may move relatively to each other (e.g., the second housing may move closer to the first housing in the third direction DR3 or move away from the first housing in the third direction DR3).

In some embodiments, one end of the flexible cable 500 may be connected through the connector CN to the printed circuit board MB fixed in the rotating shaft 300, while the other end of the flexible cable 500 may be connected to the main board 700, and the main board 700 may be disposed (e.g., mounted) in the same first housing as the rotating shaft 300. In such a case, the main board 700 may be fixed and stationary.

Figure 6:
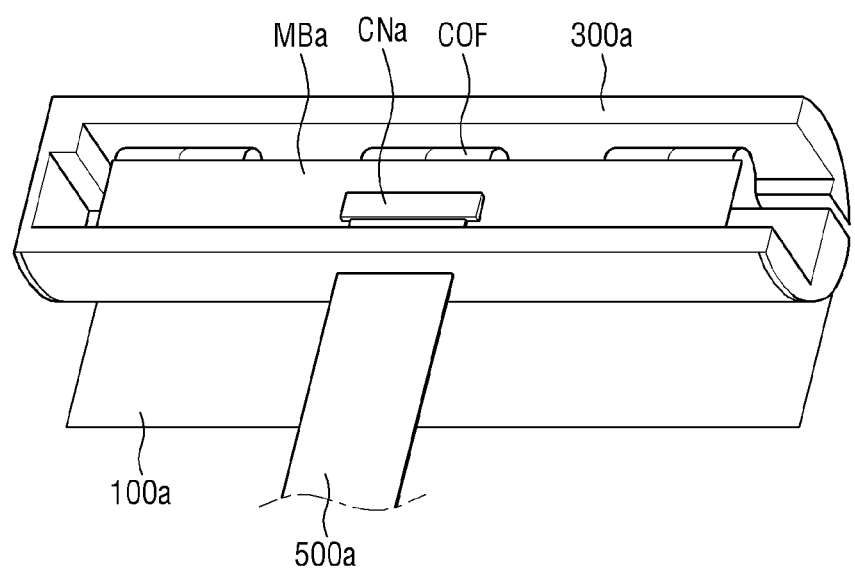
FIG. 6 is a perspective view showing a display panel, a rotating shaft, and the interior of the rotation shaft of a conventional display panel.

FIG. 6 is a perspective view showing a display panel, a rotating shaft, and the interior of the rotation shaft of a conventional display panel.

Referring to FIG. 6, a main board (e.g., main board 700 in FIGS. 1, 4 and 5) and a printed circuit board MBa may each be connected to a flexible cable 500a connected to a connector CNa, and a display panel 100a may be connected to the printed circuit board MBa through a chip-on film COF. Even in the conventional structure, the printed circuit board MBa is fixed in a rotating circuit board 300a, and thus the display panel 100a and the flexible cable 500a may rolled and/or unrolled as the rotating shaft 300 rotates. However, as shown in FIG. 6, since the display panel 100a and the flexible cable 500a overlap each other, when the display panel 100a and the flexible cable 500a are rolled, interference between the display panel 100a and the flexible cable 500a may occur. In this case, the display panel 100a and the flexible cable 500a may be rolled together while overlapping each other, thereby increasing the overall set size.

However, in the display device 1 in an embodiment, as will be described below, the rotating shaft 300 is designed to protrude further than the second edge SEG2 (refer to FIGS. 1, 2 and 4) of the display panel 100 in the second direction DR2, the printed circuit board MB and the flexible cable 500 are connected to each other in the protruding region, and the flexible cable 500 and the main board 700 are designed to be wound around the outer circumferential surface of the protruding region of the rotating shaft 300 such that each of the flexible cable 500 and the main board 700 does not interfere with the display panel 100. Accordingly, the diameter of the rotating shaft 300 is prevented from increasing, thereby reducing an increase in the overall set size of the display device 1 including the rotating shaft 300.

A detailed description thereof will be given with reference to FIGS. 7 to 9.

FIG. 7 is a perspective view showing the display panel, the rotating shaft, and the interior of the rotating shaft of the display device of FIG. 1. FIG. 8 is a partial perspective view showing the display panel, the rotating shaft, the interior of the rotating shaft, the flexible cable, and the main board of the display device of FIG. 1. FIG. 9 is a side view of the display device of FIG. 8.

Figure 8:
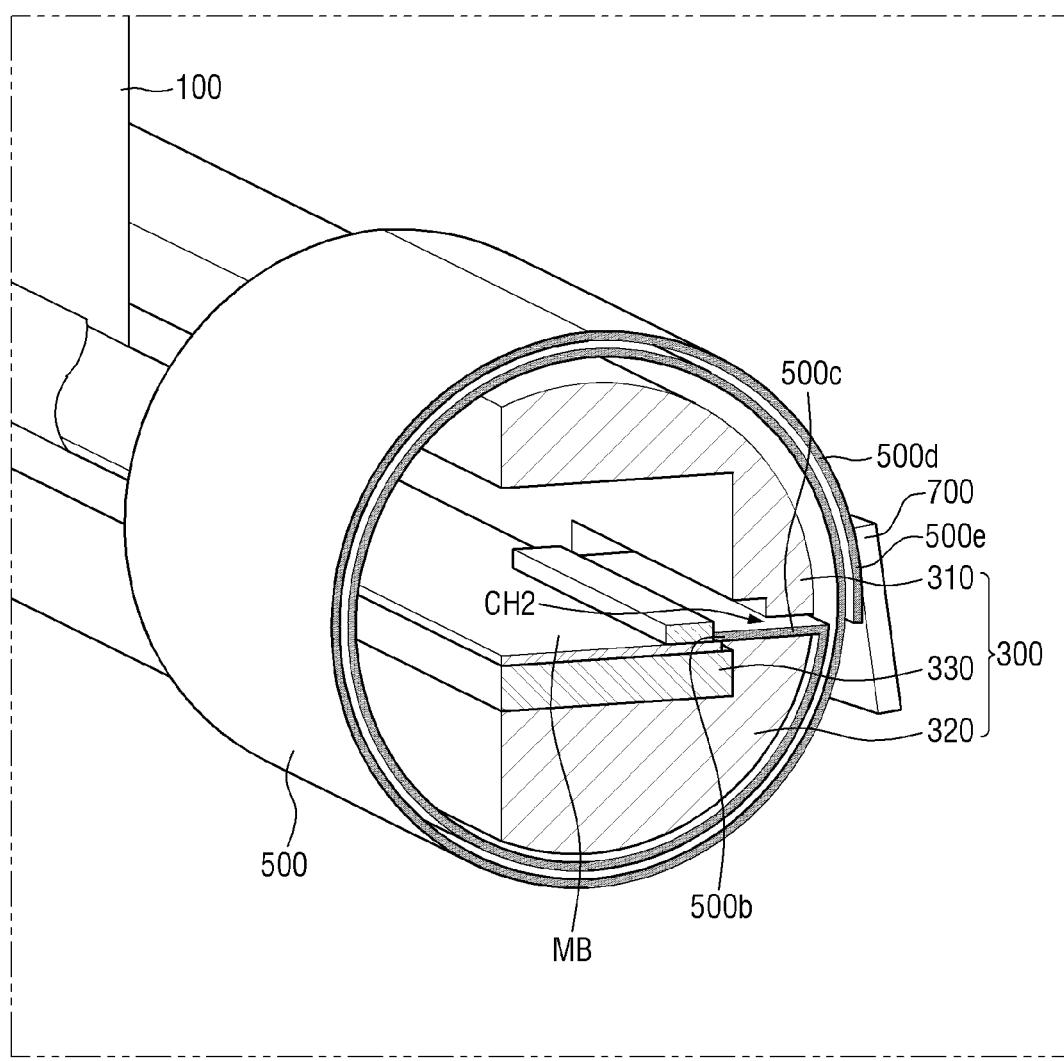
FIG. 8 is a perspective view showing an embodiment of the display panel, the rotating shaft, the interior of the rotating shaft, a flexible cable, and a main board of the display device of FIG. 1.
Figure 9:
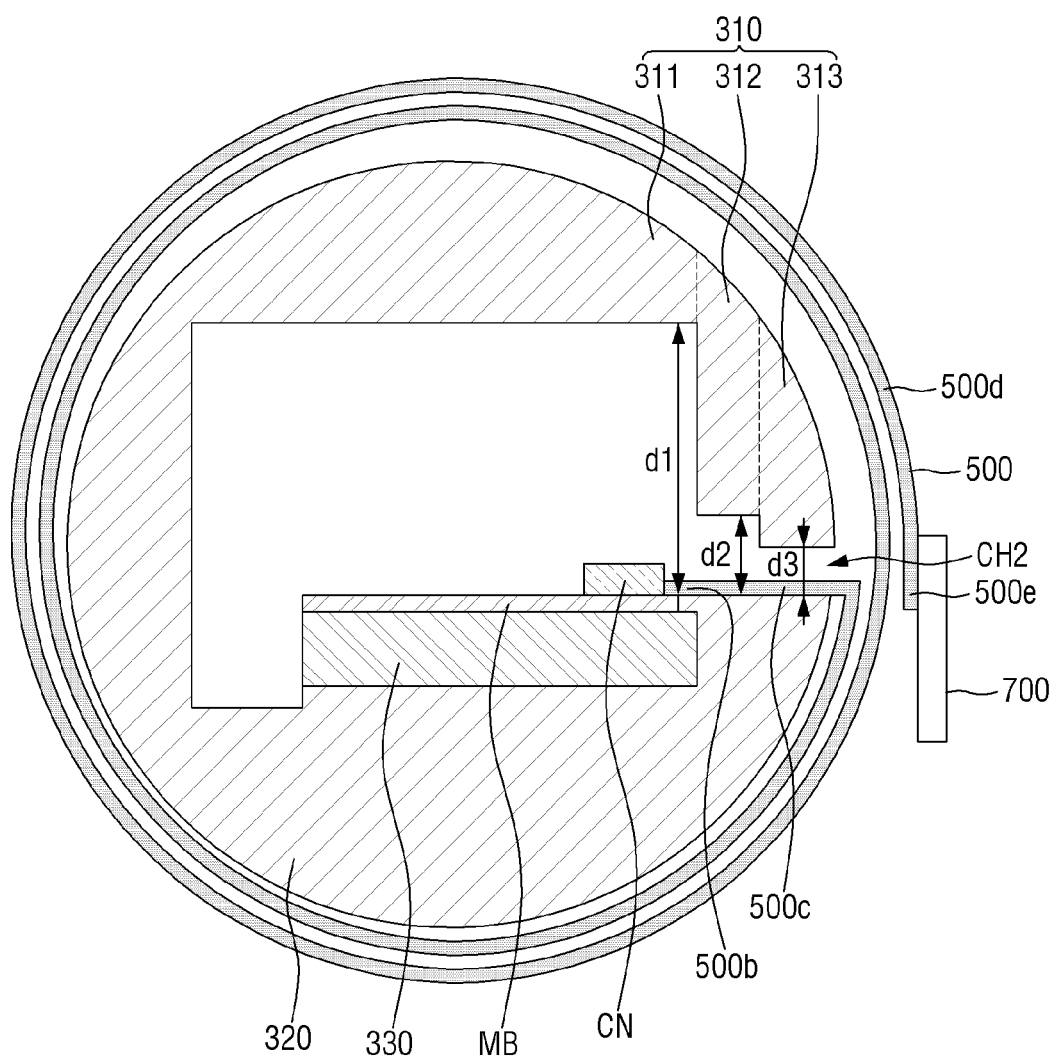
FIG. 9 is a side view of the display device of FIG. 8.

Referring to FIGS. 7 to 9, the rotating shaft 300 may include an overlapping portion OVP and a protruding portion PTP. The overlapping portion OVP overlaps the display panel 100 along the third direction DR3, and the protruding portion PTP does not overlap the display panel 100 along the third direction DR3. The protruding portion PTP may be a portion that protrudes further than the second edge SEG2 of the display panel 100 in the second direction DR2. The first cut-out groove CH1 of the rotating shaft 300 may be defined in the overlapping portion OVP.

The printed circuit board MB disposed inside the rotating shaft 300 may protrude further than the second edge SEG2 of the display panel 100 in the second direction DR2 (which will be hereinafter referred to as a "board protruding portion"). The board protruding portion may be accommodated in the protruding portion PTP of the rotating shaft 300.

The connector CN may be disposed at the board protruding portion and connected to the flexible cable 500. That is, the connector CN and the flexible cable 500 may be disposed on the protruding portion PTP of the rotating shaft 300. As shown in FIGS. 8 and 9, the flexible cable 500 may include one end portion 500b connected to the connector CN, a cable flat portion 500c horizontally extending in the first direction DR1, and a cable bent portion 500d bent (along the third direction DR3) from the cable flat portion 500c and wound around the outer circumferential surface of the rotating shaft 300. The cable flat portion 500c may extend up to a second cut-out groove CH2 defined in the protruding portion PTP of the rotating shaft 300. The cable bent portion 500d of the flexible cable 500 may be wound in double layers around the protruding portion PTP of the rotating shaft 300, but is not limited thereto. The other end portion 500e of the cable bent portion 500d of the flexible cable 500 may be connected to the main board 700. In the illustrated embodiment, the first cut-out groove CH1 and the second cut-out groove CH2 may be defined at different positions from each other. However, the disclosure is not limited thereto, such that the first cut-output groove CH1 and the second cut-out groove CH2 may be defined at the same position. That is, the second cut-out groove CH2 may be defined on an extended line of the first cut-out groove CH1. In some embodiments, the first cut-out groove CH1 and the second cut-out groove CH2 may refer to the same cut-out groove. In other words, the first cut-out groove CH1 may be unitary with the second cut-out groove CH2.

As shown in FIG. 8, the rotating shaft 300 may include a first shaft portion 310, a second shaft portion 320, and a seating portion 330 disposed between the second shaft portion 320 and the printed circuit board MB. The first shaft portion 310 may be spaced apart from the second shaft portion 320 with the seating portion 330 interposed therebetween, and a space between the first shaft portion 310 and the seating portion 330 may be defined as the above-described hollow of the rotating shaft 300. The first shaft portion 310 and the second shaft portion 320 may be spaced apart from each other with the flexible cable 500 interposed therebetween. In the drawings, the first shaft portion 310 may be disposed at an upper portion of the flexible cable 500 and the second shaft portion 320 may be disposed at a lower portion of the flexible cable 500.

The printed circuit board MB may be fixed to an upper surface of the seating portion 330.

The first shaft portion 310 may include a first sub-shaft portion 311, a second sub-shaft portion 312, and a third sub-shaft portion 313. The first sub-shaft portion 311 is spaced apart from the second shaft portion 320 by a first distance d1 in the thickness direction (e.g., the third direction DR3); the second sub-shaft portion 312 is spaced apart from the second shaft portion 320 by a second distance d2 in the thickness direction (e.g., the third direction DR3), and the third sub-shaft portion 313 is spaced apart from the second shaft portion 320 by a third distance d3 in the thickness direction (e.g., the third direction DR3). The second sub-shaft portion 312 may be disposed between the first sub-shaft portion 311 and the third sub-shaft portion 313. The second cut-out groove CH2 may be defined between the first shaft portion 310 and the second shaft portion 320. The second distance d2 has a value between a value of the first distance d1 and a value of the third distance d3, and the first distance d1 may be greater than the third distance d3.

As described above, in the display device 1, the rotating shaft 300 may be designed to protrude further than the second edge SEG2 of the display panel 100 in the second direction DR2, the printed circuit board MB and the flexible cable 500 may be connected to each other in the protruding region, and the flexible cable 500 and the main board 700 may be designed to be rolled and/or unrolled along the outer circumferential surface of the protruding region of the rotating shaft 300 such that each of them does not interfere with the display panel 100. Accordingly, increase in the overall set size of the display device 1 may be reduced.

Hereinafter, another embodiment will be described.

Figure 10:
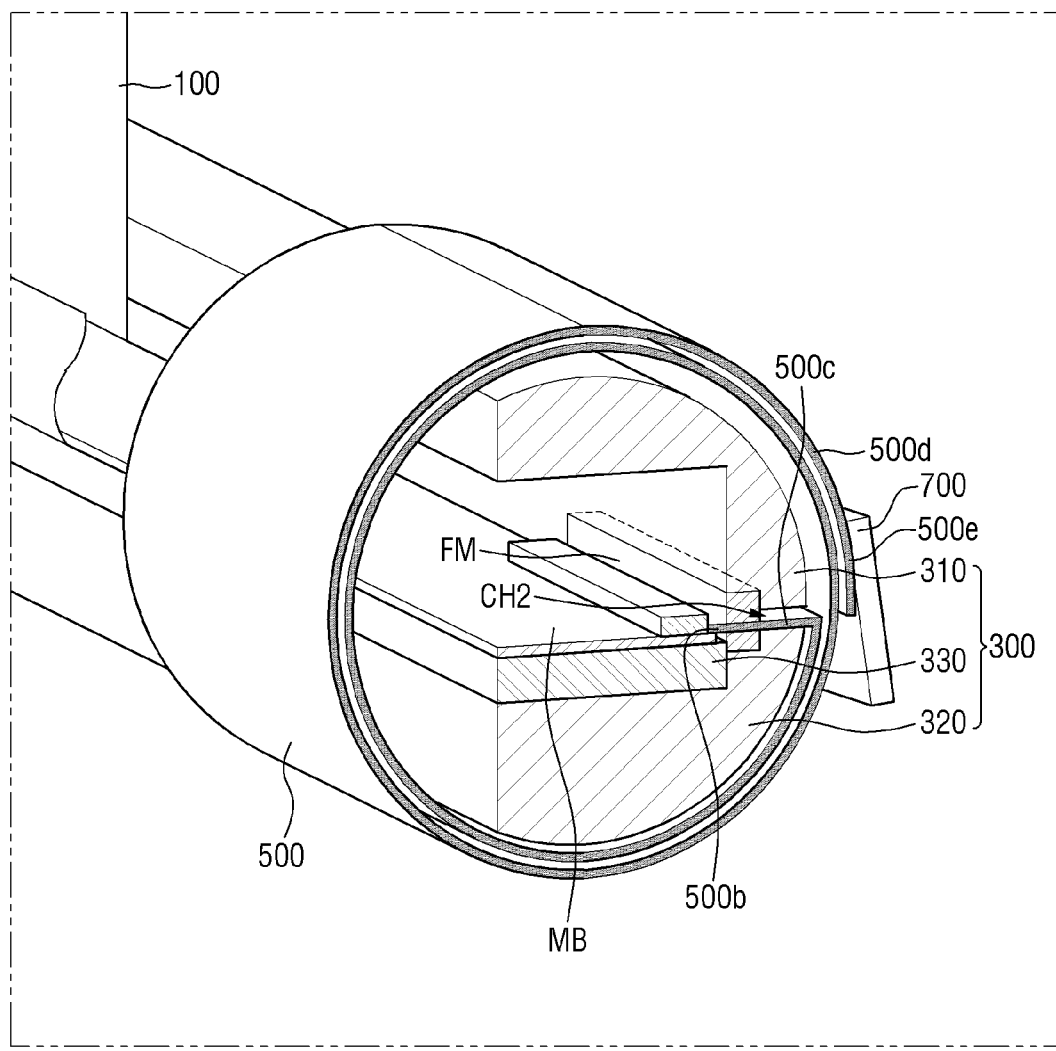
FIG. 10 is a perspective view showing an embodiment of a display panel, a rotating shaft, the interior of the rotating shaft, a flexible cable, and a main board of a display device.

FIG. 10 is a perspective view showing an embodiment of a display panel, a rotating shaft, the interior of the rotating shaft, a flexible cable, and a main board of a display device.

Figure 11:
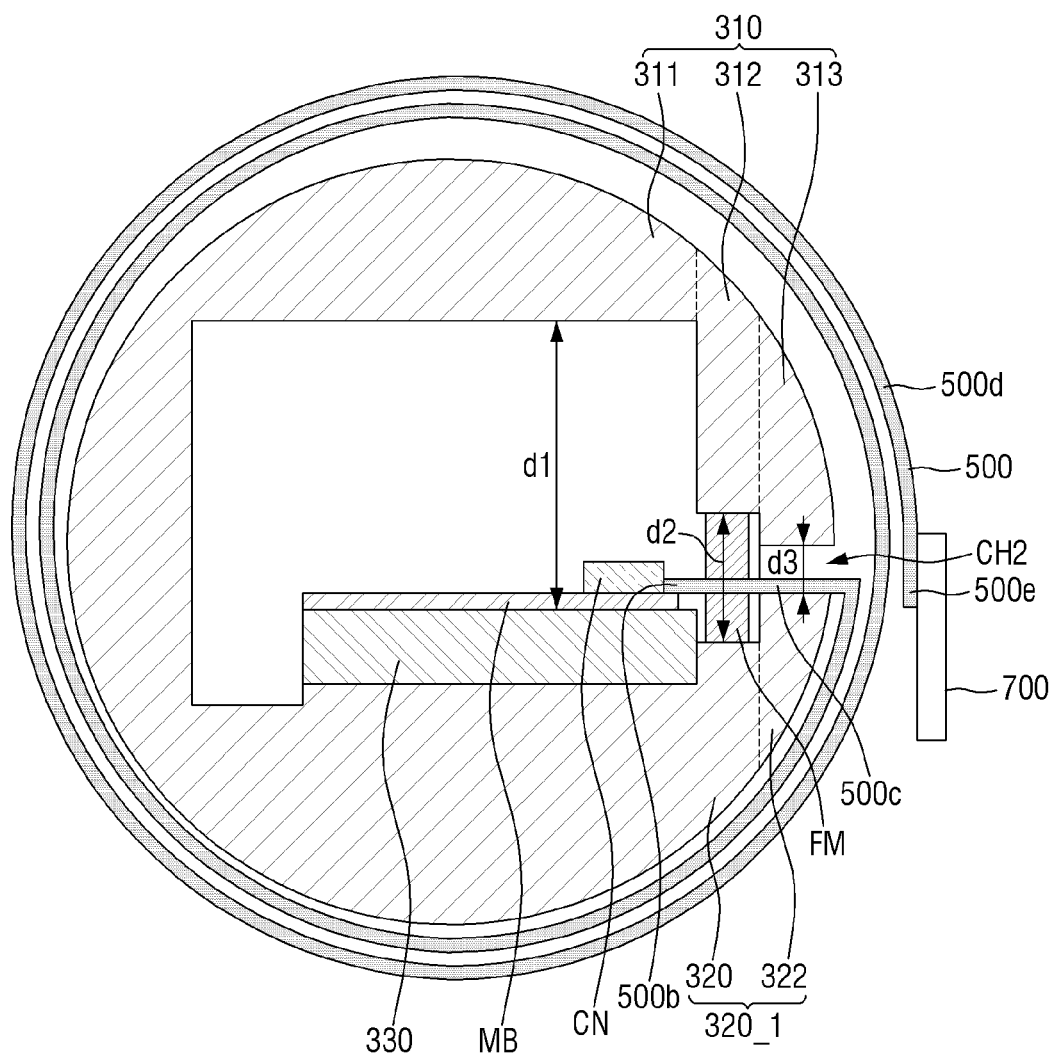
FIG. 11 is a side view of the display device of FIG. 10.

FIG. 11 is a side view of the display device of FIG. 10.

Referring to FIGS. 10 and 11, a display device in the illustrated embodiment is different from the display device 1 shown in FIGS. 8 and 9 in that the display device further includes a fixing pin FM disposed between the first shaft portion 310 and the second shaft portion 320 and fixing the cable flat portion. The display device in the illustrated embodiment is modified from the embodiment described above with reference to FIGS. 4 and 5 in which the main board 700 is fixed and stationary in the display device 1. That is, the fixing pin FM may prevent a portion of the flexible cable 500 from being rolled or unrolled (e.g., moving) according to the rotation of the rotating shaft 300 as much as possible.

More specifically, the display device in the illustrated embodiment may further include the fixing pin FM which is disposed between the first shaft portion 310 and a second shaft portion 320_1 and fixes the cable flat portion 500c. The fixing pin FM may be disposed between a second sub-shaft portion 312 and the second shaft portion 320_1. The second shaft portion 320_1 may include a fourth sub-shaft portion 320 and a fifth sub-shaft portion 322. The fourth sub-shaft portion 320 is connected to the seating portion 330, and the fifth sub-shaft portion 322 is spaced apart from the seating portion 330 with the fourth sub-shaft portion 320 interposed therebetween. An upper surface of the fourth sub-shaft portion 320 may be recessed downward from an upper surface of the fifth sub-shaft portion 322.

The fixing pin FM may be disposed between the second sub-shaft portion 312 and the fourth sub-shaft portion 320 of the second shaft portion 320_1 and may fix the cable flat portion 500c of the flexible cable 500 from above and below. Accordingly, the movement of the flexible cable 500 is minimized, thereby preventing a disconnection of the flexible cable 500.

Other elements have been described with reference to FIGS. 8 and 9, and thus detailed descriptions thereof will be omitted.

Figure 12:
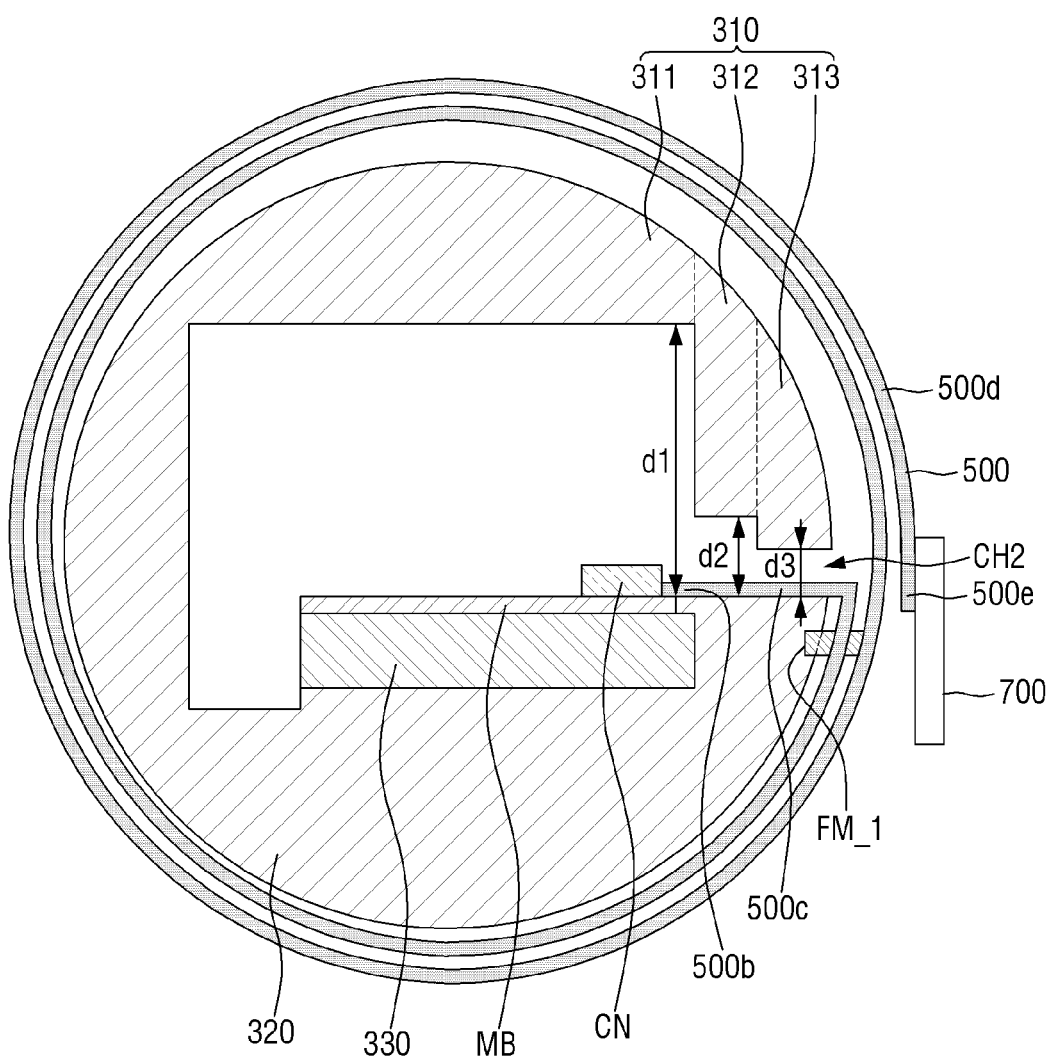
FIG. 12 is a side view of an embodiment of a display device.

FIG. 12 is a side view of a display device.

Referring to FIG. 12, a display device in the illustrated embodiment is different from the display device shown in FIG. 9 in that the display device further includes a fixing pin FM_1 fixing the cable bent portion 500d of the flexible cable 500 to the first shaft portion 310 or the second shaft portion 320.

More specifically, the display device in the illustrated embodiment may further include the fixing pin FM_1 fixing the cable bent portion 500d of the flexible cable 500 to the first shaft portion 310 or the second shaft portion 320. In FIG. 12, the fixing pin FM_1 may fix the cable bent portion 500d of the flexible cable 500 to the second shaft portion 320.

The fixing pin FM_1 may fix the cable bent portion 500d of the flexible cable 500. Accordingly, the movement of the flexible cable 500 is minimized, thereby preventing a disconnection of the flexible cable 500.

Other elements have been described with reference to FIGS. 8 and 9, and thus detailed descriptions thereof will be omitted.

Figure 13:
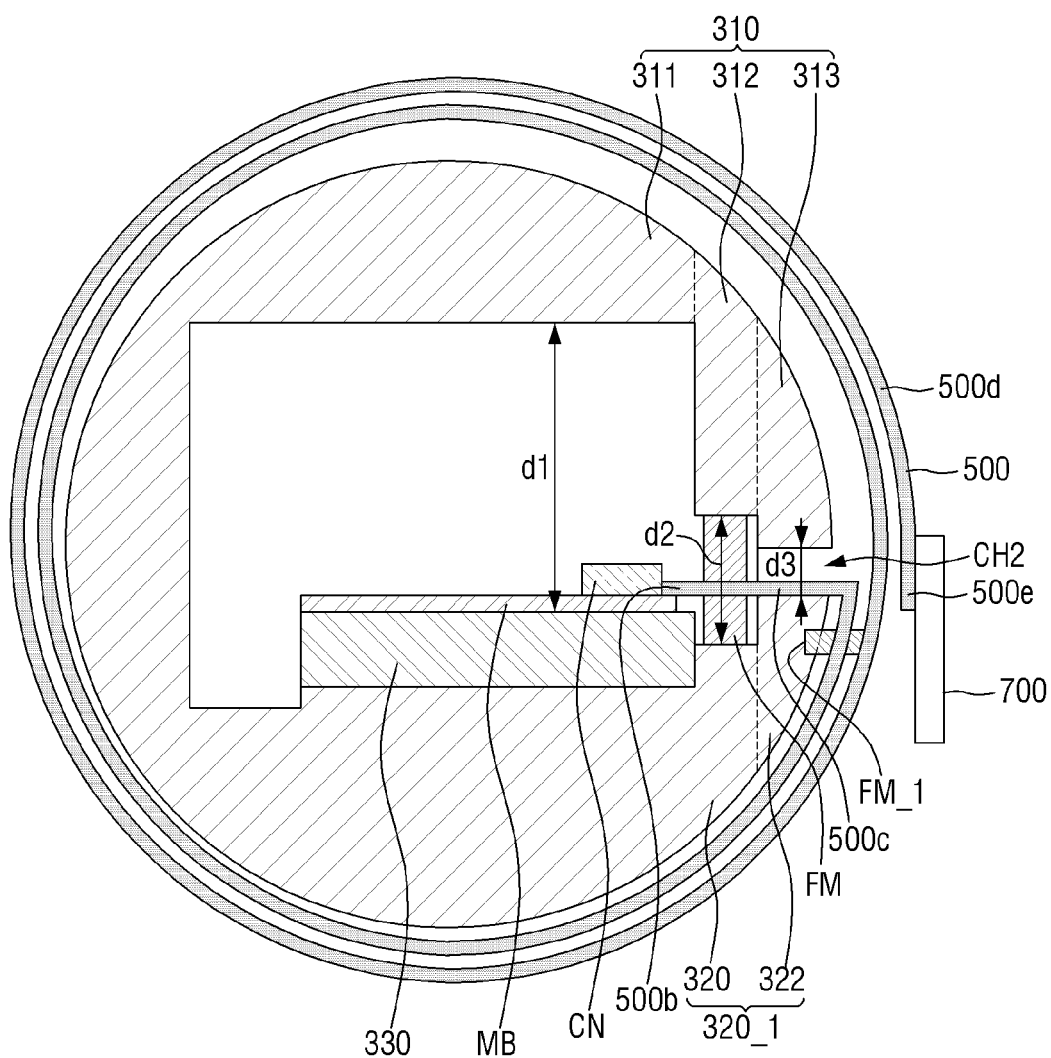
FIG. 13 is a side view of an embodiment of a display device.

FIG. 13 is a side view of another embodiment of a display device.

Referring to FIG. 13, a display device in the illustrated embodiment is different from the display device shown in FIG. 11 in that both the fixing pin FM shown in FIG. 11 and the fixing pin FM_1 shown in 12 are disposed in the display device.

Other elements have been described with reference to FIGS. 8, 9, 11, and 12, and thus detailed descriptions thereof will be omitted.

Figure 14:
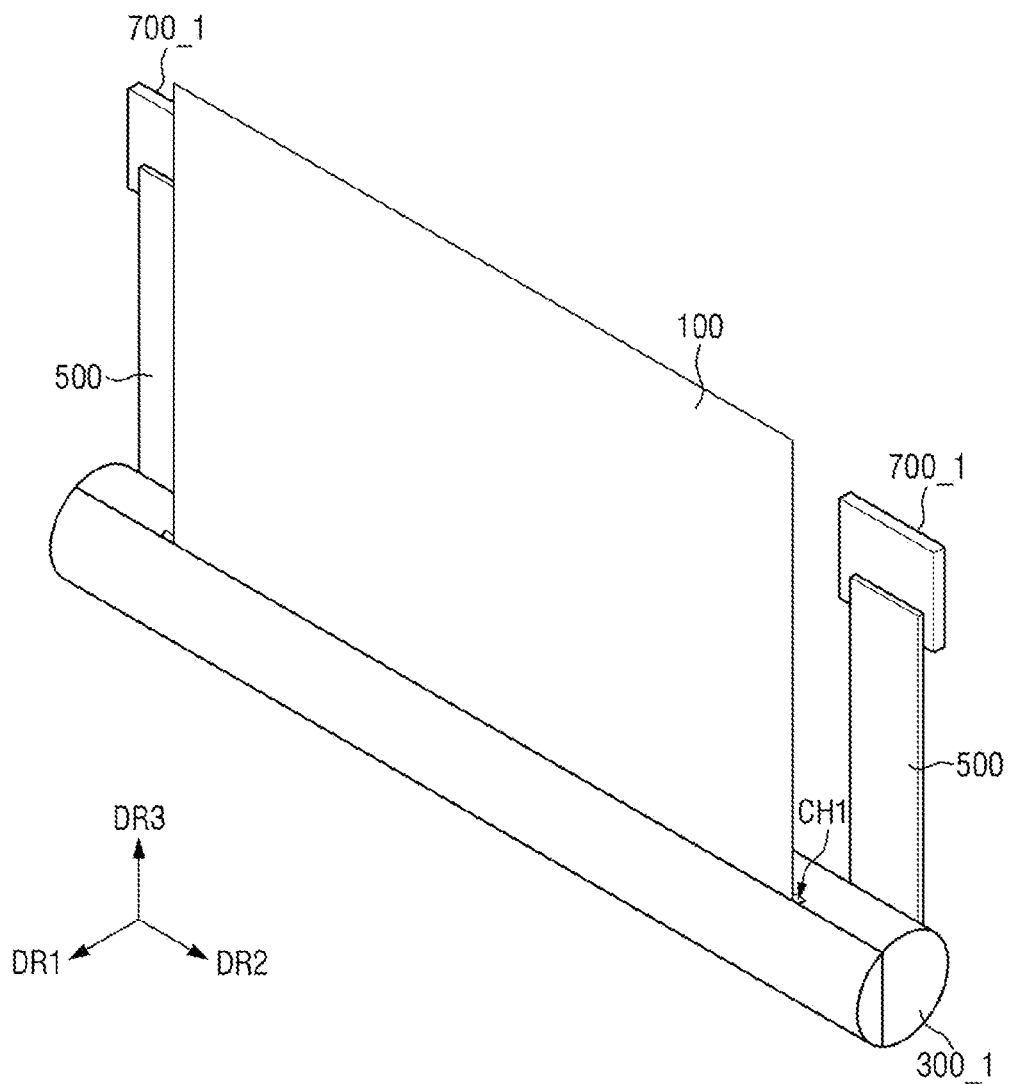
FIG. 14 is a perspective view of an embodiment of a display device.
Figure 15:
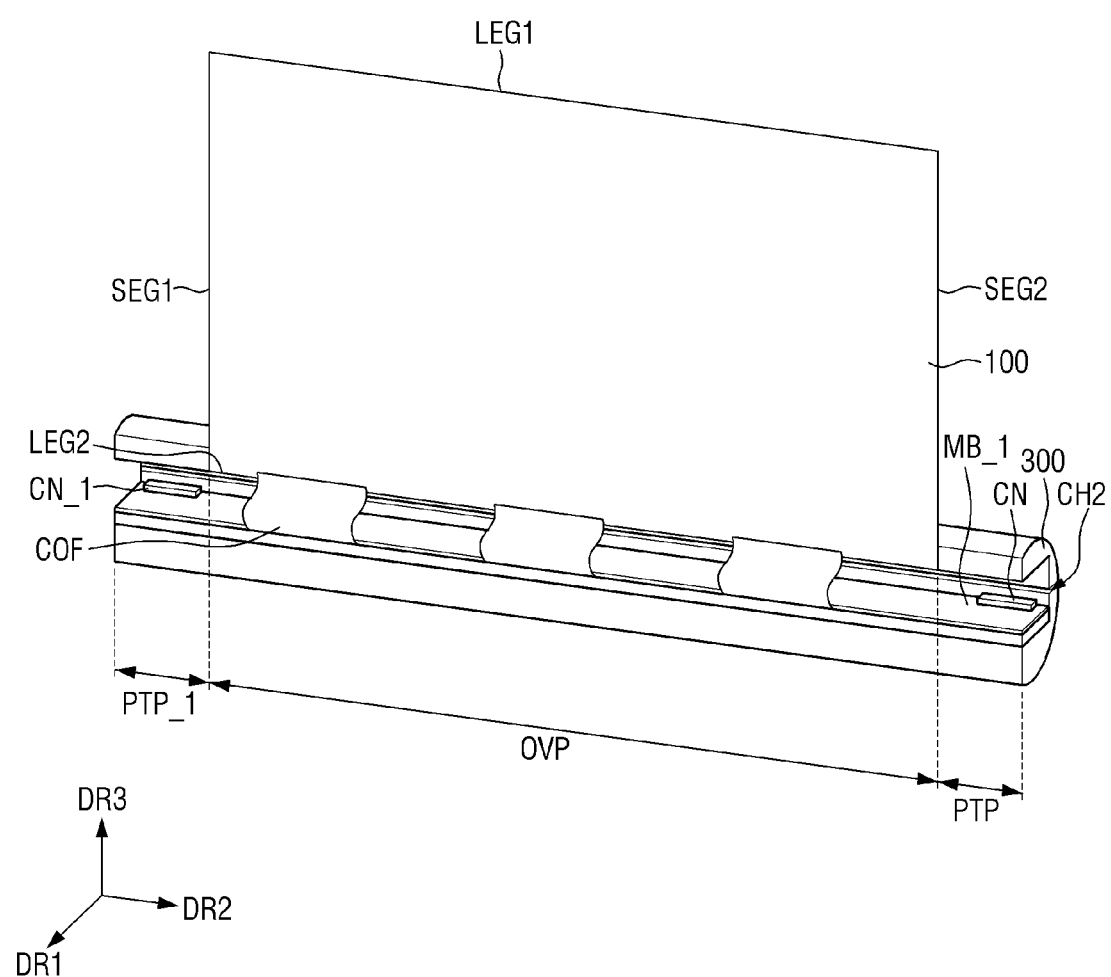
FIG. 15 is a perspective view showing a display panel, a rotating shaft, and the interior of the rotating shaft of the display device of FIG. 14.

FIG. 14 is a perspective view of a display device. FIG. 15 is a perspective view showing a display panel, a rotating shaft, and the interior of the rotating shaft of the display device of FIG. 14.

Referring to FIGS. 14 and 15, a display device in the illustrated embodiment is different from the display device shown in FIGS. 1 and 7 in that a rotating shaft 300_1 of the display device further includes a protruding portion PTP_1 which protrudes further than the first edge SEG1 of the display panel 100 in a direction opposite to the second direction DR2.

More specifically, the rotating shaft 300_1 of the display device in the illustrated embodiment may further include the protruding portion PTP_1 which protrudes further than the first edge SEG1 of the display panel 100 in the direction opposite to the second direction DR2. In the illustrated embodiment, two main boards 700-1 may respectively correspond to the protruding portions PTP and PTP_1.

A third cut-out groove extending in the second direction DR2 is further defined in the protruding portion PTP_1. However, the disclosure is not limited thereto, and the third cut-out groove may be unitary with the second cut-out groove CH2.

A printed circuit board MB_1 may further include a second connector CN_1, and the second connector CN_1 may overlap the protruding portion PTP_1.

In the illustrated embodiment, the display device may further include a second flexible cable 500_1 which has one end connected to the second connector CN_1 of the printed circuit board MB 1. As the second flexible cable 500_1 is wound around the outer circumferential surface of the protruding portion PTP_1 of the rotating shaft 300_1, the width (hereinafter referred to as a "first width") of the protruding portion PTP from the second edge SEG2 of the display panel 100 as in the display device shown in FIGS. 1 and 7 may be divided into a width (hereinafter referred to as a "second width") of the protruding portion PTP in the illustrated embodiment and a width (hereinafter referred to as a "third width") of the protruding portion PTP_1. Accordingly, structural balance of an overall set of the display device may be achieved.

Figure 16:
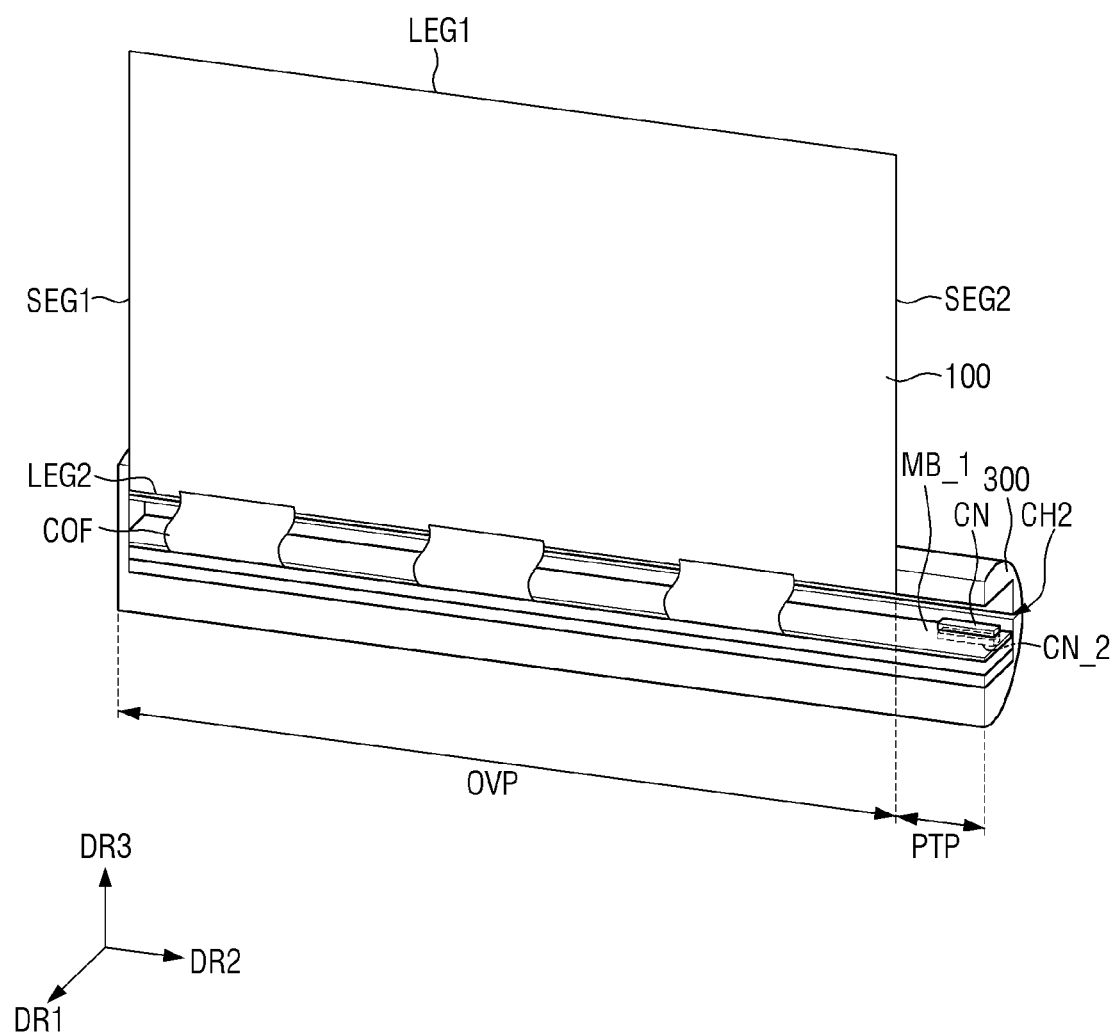
FIG. 16 is a perspective view showing an embodiment of a display panel, a rotating shaft, and the interior of the rotating shaft of a display device.
Figure 17:
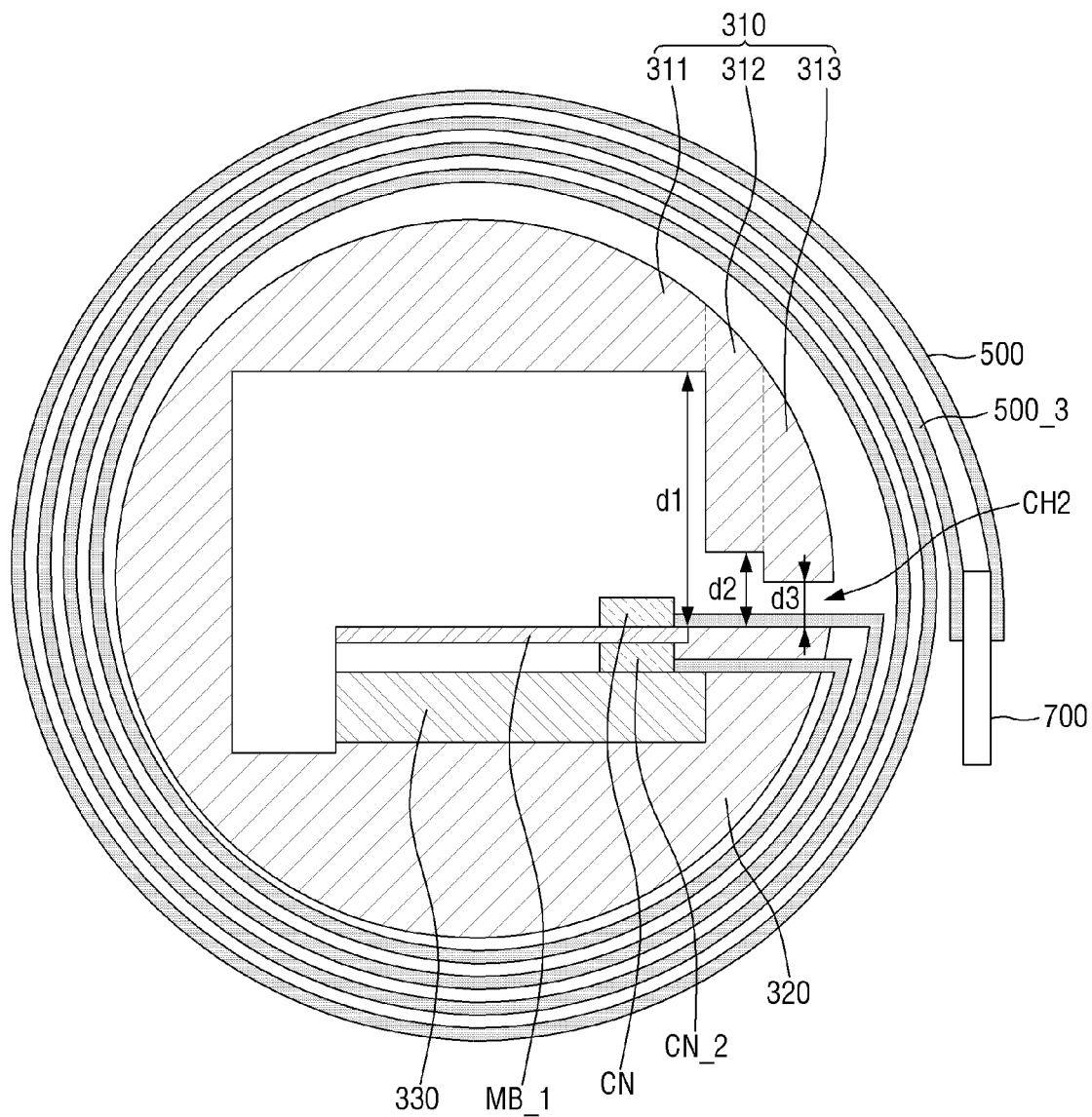
FIG. 17 is a side view of the display device of FIG. 16.

FIG. 16 is a perspective view showing a display panel, a rotating shaft, and the interior of the rotating shaft of a display device. FIG. 17 is a side view of the display device of FIG. 16.

Referring to FIGS. 16 and 17, a display device in the illustrated embodiment is different from the display device shown in FIGS. 7 and 9 in that a second connector CN_2 of a printed circuit board MB_1 of the display device is spaced apart from the connector CN with the printed circuit board MB_1 interposed therebetween.

More specifically, the second connector CN_2 of the printed circuit board MB_1 may be spaced apart from the connector CN with the printed circuit board MB_1 interposed therebetween. The flexible cable 500 may be connected to the connector CN and a second flexible cable 500_3 may be connected to the second connector CN_2. Each of the flexible cable 500 and the second flexible cable 500_3 may be wound around the outer circumferential surface of the protruding portion PTP and may be connected together to the main board 700. The flexible cable 500 and the second flexible cable 500 3 may each be wound around the outer circumferential surface of the protruding portion PTP while overlapping each other in the thickness direction.

In the illustrated embodiment, the second connector CN_2 of the printed circuit board MB_1 is spaced apart from the connector CN with the printed circuit board MB_1 interposed therebetween, the flexible cable 500 is connected to the connector CN, and the second flexible cable 500_3 is connected to the second connector CN_2, so that the width (the first width) of the protruding portion PTP from the second edge SEG2 of the display panel 100 may be reduced.

Other elements have been described with reference to FIGS. 7 and 9, and thus detailed descriptions thereof will be omitted.

By the embodiments of the disclosure, a display device which has a reduced overall set size including a rotating shaft may be provided.

However, the effects of the embodiments are not restricted to the one set forth herein. The above and other effects of the embodiments will become more apparent to one of daily skill in the art to which the embodiments pertain by referencing the claims.

Although some embodiments of the disclosure have been described above, these are merely some of embodiments and do not limit the disclosure. Further, the disclosure may be changed and modified in various ways, without departing from the features of the disclosure, by those skilled in the art. The components described in the embodiments of the disclosure may be modified, for example. Differences related to these modifications and applications should be construed as being within the scope of the disclosure defined by the claims.

What is claimed:

1. A display device comprising:
   a display panel comprising:
      first edges extending in a first direction and facing each other; and
      second edges extending in a second direction and facing each other, the second direction intersecting the first direction;
   a printed circuit board connected to the display panel and comprising a connector;
   a rotating shaft which extends in the first direction, and in which the printed circuit board is disposed and a hollow is defined, the rotating shaft comprising:
      an overlapping portion which overlaps the display panel and a first protruding portion which protrudes further than one of the second edges of the display panel in the first direction; and
   a flexible cable including a first end connected to the connector of the printed circuit board,
   wherein the display panel and the flexible cable are rolled or unrolled by being wound or unwound around an outer circumferential surface of the rotating shaft, and
   the connector is only disposed in the first protruding portion and is not disposed in the overlapping portion and the flexible cable does not overlap the overlapping portion.

2. The display device of claim 1, wherein a first cut-out groove extending in the first direction is defined in the rotating shaft,
wherein the display panel penetrates the first cut-out groove along the second direction, and
wherein the first cut-out groove is defined in the overlapping portion of the rotating shaft.

3. The display device of claim 2, wherein a second cut-out groove extending in the first direction is defined in the rotating shaft, and
wherein the flexible cable extends penetrating the second cut-out groove.

4. The display device of claim 3, wherein the second cut-out groove is defined in the first protruding portion of the rotating shaft.

5. The display device of claim 4, wherein the printed circuit board is fixedly embedded in the rotating shaft.

6. The display device of claim 5, wherein the rotating shaft rotates in a predetermined direction, wherein the display panel is wound or unwound around an outer circumferential surface of the overlapping portion according to the rotation of the rotating shaft, and
wherein the flexible cable is wound or unwound around an outer circumferential surface of the first protruding portion according to the rotation of the rotating shaft.

7. The display device of claim 6, further comprising a main board connected to a second end of the flexible cable opposite to the first end of the flexible cable.

8. The display device of claim 7, wherein the main board move when the rotating shaft rotates.

9. A display device comprising:
a display panel comprising:
first edges extending in a first direction and facing each other; and
second edges extending in a second direction and facing each other, the second direction intersecting the first direction;
a printed circuit board connected to the display panel and comprising a connector;
a rotating shaft which extends in the first direction, and in which the printed circuit board is disposed and a hollow is defined, the rotating shaft comprising:
an overlapping portion which overlaps the display panel and a first protruding portion which protrudes further than one of the second edges of the display panel in the first direction; and
a flexible cable including an end connected to the connector of the printed circuit board,
wherein the display panel is rolled or unrolled by being wound or unwound around an outer circumferential surface of the overlapping portion of the rotating shaft,
the flexible cable does not overlap the display panel, and
the connector is only disposed in the first protruding portion and is not disposed in the overlapping portion and the flexible cable does not overlap the overlapping portion.

10. The display device of claim 9, further comprising a main board, and
wherein the rotating shaft and the main board are disposed in a same housing.

11. The display device of claim 10, wherein a cut-out groove is defined in the rotating shaft, and
the flexible cable comprises a flat portion extending in a third direction and disposed in the cut-out groove, the third direction intersecting the first direction and the second direction, and a bent portion connected to the flat portion and bent along an outer circumferential surface of the first protruding portion.

12. The display device of claim 11, wherein the rotating shaft comprises a first shaft portion disposed at an upper portion of the flexible cable and a second shaft portion spaced apart from the first shaft portion with the flexible cable interposed therebetween, and
wherein the display device further comprises a fixing pin which is disposed between the first shaft portion and the second shaft portion and fixes the flat portion.

13. The display device of claim 12, wherein the rotating shaft further comprises a fixing pin which fixes the bent portion to one of the first shaft portion and the second shaft portion.

14. A display device comprising:
a display panel comprising:
first edges extending in a first direction and facing each other; and
second edges extending in a second direction and facing each other, the second direction intersecting the first direction;
a printed circuit board connected to the display panel and comprising a first connector and a second connector spaced apart from the first connector;
a rotating shaft having the printed circuit board embedded therein, extending in the first direction, and having a hollow therein, the rotating shaft comprising:
an overlapping portion which overlaps the display panel and a first protruding portion which protrudes further than one of the second edges of the display panel in the first direction; and
a first flexible cable including an end connected to the first connector of the printed circuit board and a second flexible cable including an end connected to the second connector of the printed circuit board,
wherein the display panel, the first flexible cable, and the second flexible cable are rolled or unrolled by being wound or unwound around an outer circumferential surface of the rotating shaft, and
the first connector is only disposed in the first protruding portion, the first and second connectors are not disposed in the overlapping portion and the first and second flexible cables do not overlap the overlapping portion.

15. The display device of claim 14, wherein the rotating shaft comprises a first cut-out groove extending in the first direction,
wherein the display panel penetrates the first cut-out groove along the second direction, and
wherein the first cut-out groove is defined in the overlapping portion of the rotating shaft.

16. The display device of claim 15, wherein the rotating shaft further comprises a second cut-out groove extending in the first direction,
wherein at least one of the first and second flexible cables extends penetrating the second cut-out groove, and
wherein the second cut-out groove is defined in the first protruding portion of the rotating shaft.

17. The display device of claim 16, wherein the printed circuit board is fixedly embedded in the rotating shaft.

18. The display device of claim 17, wherein the rotating shaft further comprises a second protruding portion which protrudes further than another of the second edges of the display panel in the first direction and wherein the rotating shaft further comprises a third cutout groove extending in the first direction and defined in the second protruding portion of the rotating shaft, and the second connector overlaps the second protruding portion.

19. The display device of claim 18, wherein the second flexible cable is connected to the second connector.

20. The display device of claim 17, wherein the second connector overlaps the first protruding portion and is spaced apart from the first connector with the printed circuit board interposed therebetween.

21. The display device of claim 20, wherein the first flexible cable overlaps the second flexible cable.

* * * * *